US008103649B2

(12) United States Patent
Kaneyasu et al.

(10) Patent No.: US 8,103,649 B2
(45) Date of Patent: Jan. 24, 2012

(54) SEARCH SYSTEM AND SEARCH METHOD (75) Inventors: Keisuke Kaneyasu, Oume (JP); Syuuhei Yanamoto, Tokyo (JP); Hiroyuki Tomotani, Tokyo (JP); Akinori Harada, Tokyo (JP)

(73) Assignee: NTT Docomo, Inc., Tokyo (JP)

( * ) Notice: Subject to any disclaimer, the term of this patent is extended or adjusted under 35 U.S.C. 154(b) by 530 days.

(21) Appl. No.: 12/012,678

(22) Filed: Feb. 5, 2008

(65) Prior Publication Data
US 2008/0189271 A1 Aug. 7, 2008

(30) Foreign Application Priority Data

Feb. 5, 2007 (JP) ................................. 2007-025112
Dec. 14, 2007 (JP) ................................. 2007-323297

(51) Int. Cl.
*G06F 7/00* (2006.01)
*G06F 17/30* (2006.01)

(52) U.S. Cl. . 707/706; 707/736; 707/748; 707/E17.046; 707/999.003; 705/14.4; 705/14.5; 705/14.6

(58) Field of Classification Search ......... 705/14.4–14.6
See application file for complete search history.

(56) References Cited

U.S. PATENT DOCUMENTS

| | | | | | |
|---|---|---|---|---|---|
| 5,968,125 | A | * | 10/1999 | Garrick et al. | 709/224 |
| 6,078,866 | A | * | 6/2000 | Buck et al. | 702/2 |
| 6,219,667 | B1 | * | 4/2001 | Lu et al. | 707/763 |
| 6,421,675 | B1 | * | 7/2002 | Ryan et al. | 1/1 |
| 7,596,506 | B2 | * | 9/2009 | Shapira et al. | 705/10 |
| 7,599,938 | B1 | * | 10/2009 | Harrison, Jr. | 1/1 |
| 7,711,735 | B2 | * | 5/2010 | Wu et al. | 707/737 |
| 7,757,170 | B2 | * | 7/2010 | Billsus et al. | 715/714 |
| 2003/0074350 | A1 | * | 4/2003 | Tsuda | 707/3 |
| 2003/0135490 | A1 | * | 7/2003 | Barrett et al. | 707/3 |
| 2004/0034706 | A1 | * | 2/2004 | Cohen et al. | 709/225 |
| 2004/0254942 | A1 | * | 12/2004 | Error et al. | 707/100 |
| 2005/0060310 | A1 | * | 3/2005 | Tong et al. | 707/7 |
| 2006/0064411 | A1 | * | 3/2006 | Gross et al. | 707/3 |
| 2006/0212308 | A1 | * | 9/2006 | Mori et al. | 705/1 |
| 2007/0100824 | A1 | * | 5/2007 | Richardson et al. | 707/7 |
| 2007/0185827 | A1 | * | 8/2007 | Mrzyglocki | 707/1 |
| 2008/0082655 | A1 | * | 4/2008 | Goswami | 709/224 |

FOREIGN PATENT DOCUMENTS

| | | |
|---|---|---|
| JP | 2002-202992 | 7/2002 |
| JP | 2003-076715 | 3/2003 |
| JP | 2003-281179 | 10/2003 |
| JP | 2004-029943 | 1/2004 |

* cited by examiner

*Primary Examiner* — Kuen Lu
*Assistant Examiner* — Jessica N Le
(74) *Attorney, Agent, or Firm* — Michaud-Kinney Group LLP (57) ABSTRACT

In a search system for searching a database based on a keyword input from a portable terminal while outputting a result of the search to the portable terminal to display, there are provided a search server that searches the database for information including the input keyword, a degree-of-popularity calculating apparatus which acquires number-of-member information from an i-Mode® server having the number-of-member information on the number of members for each menu in which various webpages are sorted for each category thereof, and calculates the degree of popularity of the menu based on the acquired number-of-member information, and information ranking means for ranking a plurality of pieces of information searched by the search server based on the degree of popularity of the menu to which the information belongs generated by the degree-of-popularity calculating apparatus.

16 Claims, 9 Drawing Sheets

| MENU | THE NUMBER OF DUES-PAYING MEMBERS | THE NUMBER OF DUES-FREE MEMBERS | URL | MEMBERSHIP DUES |
|---|---|---|---|---|
| MENU A | 2000 | 0 | http://www.nttdocomo.co.jp/pageA/123<br>http://www.nttdocomo.co.jp/pageC/456 | 300 YEN |
| MENU B | 0 | 1000 | http://www.nttdocomo.co.jp/pageB/123<br>http://www.nttdocomo.co.jp/pageD/456 | 0 YEN |
| MENU C | 2000 | 0 | http://www.nttdocomo.co.jp/pageD/123<br>http://www.nttdocomo.co.jp/pageE/456 | 200 YEN |

| URL | THE NUMBER OF ACCESSES | THE NUMBER OF VISITORS |
|---|---|---|
| http://www.nttdocomo.co.jp/pageA/123 | 100 | 50 |
| http://www.nttdocomo.co.jp/pageB/123 | 50 | 20 |
| http://www.nttdocomo.co.jp/pageC/456 | 200 | 100 |
| http://www.nttdocomo.co.jp/pageD/456 | 100 | 60 |
| . | . | . |
| . | . | . |
| http://www.nttdocomo.co.jp/pageZ/456 | 200 | 150 |

FIG.3

| MENU | THE NUMBER OF DUES-PAYING MEMBERS | THE NUMBER OF DUES-FREE MEMBERS | URL |
|---|---|---|---|
| MENU A | 2000 | 0 | http://www.nttdocomo.co.jp/pageA/123 |
| | | | http://www.nttdocomo.co.jp/pageC/456 |
| MENU B | 0 | 1000 | http://www.nttdocomo.co.jp/pageB/123 |
| | | | http://www.nttdocomo.co.jp/pageD/456 |

| CORRESPONDING PAGE | BELONGING-MENU |
|---|---|
| PAGE A | MENU A |
| PAGE B | MENU B |
| PAGE C | MENU A |

FIG.5B

| BELONGING-MENU | DUES-PAYING MEMBER | DUES-FREE MEMBER | THE NUMBER OF VISITORS OVER THE MENU | THE NUMBER OF ACCESSES TO THE ENTIRE MENU |
|---|---|---|---|---|
| MENU A | 2000 | 0 | 1000 | 2000 |
| MENU B | 0 | 1000 | 2000 | 1500 |

FIG.5C

| CORRESPONDING PAGE | THE NUMBER OF VISITORS | THE NUMBER OF ACCESSES |
|---|---|---|
| PAGE A | 50 | 100 |
| PAGE B | 20 | 50 |
| PAGE C | 100 | 200 |

PAGE A)
FOR <u>CELLULAR TELEPHONES</u>, DISCOUNTER ○○ELECTRICS !!
EXCELLENT SHOP WITH WIDE SELECTION

FIG.7B

PAGE B)
LATEST <u>CELLULAR TELEPHONE</u> 506 IS RELEASED !! LOADED WITH
INFORMATION RELATED TO LATEST <u>CELLULAR TELEPHONES</u> INCLUDING
STANDBY SCREEN SUPPORTING PAGERS, RINGING TONE, ETC.

FIG.7C

PAGE C)
WE INTRODUCE INFORMATION OF FOMA, mova, ETC., VARIOUS SERVICES
SUCH AS i-MODE, ETC, PRICE PLANS AND SUPPORT INFORMATION

| MENU | THE NUMBER OF DUES-PAYING MEMBERS | THE NUMBER OF DUES-FREE MEMBERS | URL | MEMBERSHIP DUES |
|---|---|---|---|---|
| MENU A | 2000 | 0 | http://www.nttdocomo.co.jp/pageA/123<br>http://www.nttdocomo.co.jp/pageC/456 | 300 YEN |
| MENU B | 0 | 1000 | http://www.nttdocomo.co.jp/pageB/123<br>http://www.nttdocomo.co.jp/pageD/456 | 0 YEN |
| MENU C | 2000 | 0 | http://www.nttdocomo.co.jp/pageD/123<br>http://www.nttdocomo.co.jp/pageE/456 | 200 YEN |

FIG.10

SEARCH SYSTEM AND SEARCH METHOD

The present disclosure relates to subject matters contained in Japanese Patent Application No. 2007-25112 filed on Feb. 5, 2007 and No. 2007-323297 filed on Dec. 14, 2007, which are expressly incorporated herein by reference in its entireties.

FIELD OF THE INVENTION

The present invention relates to a search system and search method for determining a display order of a search result corresponding to the degree of popularity in a search of webpages.

BACKGROUND OF THE INVENTION

Conventionally, in a search in a cellular telephone, there has been a proposal for determining a display order of a result of the search corresponding to the degree of menu popularity (for example, Japanese Laid-Open Patent Publication No. 2003-281179 (Patent Document 1), and Japanese Laid-Open Patent Publication No. 2003-76715 (Patent Document 2)). Patent Document 1 describes extracting link information of webpages that are hits in a search based on a keyword, obtaining the degree of popularity of each of the webpages based on a history (log information) of access to each webpage provided from a server apparatus of a provider, for example, based on the high or low number of times the webpage is accessed, or the like, sorting the link information to each of the webpages in descending order of the degree of popularity, and displaying in descending order of the degree of popularity, for example, from the top to the bottom in a browser of a user terminal apparatus. In other words, Patent Document 1 discloses determining a display order of a search result corresponding to the degree of popularity in a search engine.

Patent Document 2 describes a webpage search method based on the degree of visit popularity by webpage extracted using disk cache information of a user computer. In the webpage search method, an IP (Internet Protocol) address is checked from received URL (Uniform Resource Locator) information to eliminate overlapping domains, the visited URL information is extracted by a user, and the visited URL information by user is rearranged to the number of visit times by webpage, and converted into the degree of visit popularity to be stored.

In gaining access to a search site to find desired information, a plurality of webpages having the same information are often extracted. The information extracted from different webpages can differ in accuracy and usefulness to the user. Accordingly, in determining display order of a search result, it is not possible to determine whether the webpage is yielding reliable information simply by grasping the number of times the webpage is accessed. In other words, it is not possible to make a judgment regarding whether or not a webpage reached via a search contains reliable information or useful information.

SUMMARY OF THE INVENTION

It is an object of the present invention to provide a search system and search method enabling preferential display of reliable and useful information receiving support from many users.

The search system of the invention is characterized by a search system for searching a database based on a keyword input from a terminal while outputting a result of the search to the terminal for display, having search means for searching the database for information including the input keyword, degree-of-popularity calculating means for acquiring number-of-member information from a server having the number-of-member information on the number of members for each menu and calculating the degree of popularity of the menu based on the acquired number-of-member information, and information ranking means for ranking a plurality of pieces of information searched by the search means based on the degree of popularity of the menu to which the information belongs generated by the degree-of-popularity calculating means.

According to the aforementioned configuration, the number-of-member information for each menu is acquired using a server such as an i-Mode® server or the like having the number-of-member information on the number of members for each menu. Then, the degree of popularity of the menu is calculated using the number-of-member information to reflect in determination of the display order of the search result, and it is thereby possible to preferentially display the useful information with reliability receiving support from many users in the search of webpages.

Further, in the above-mentioned configuration, it is preferable that the degree-of-popularity calculating means acquires the access information from the server having the access information on access for each page, and calculates the degree of popularity of the page based on the access information. The information ranking means ranks a plurality of pieces of information searched by the search means based on the degree of popularity of the menu and the degree of popularity of the page to which the information belongs. In this case, the access information for each page is acquired from the server such as the i-Mode® server or the like having the access information on access for each page. Then, the degree of popularity of the page is calculated using the access information to reflect in determination of the display order of the search result, and it is thereby possible to preferentially display the useful information with reliability receiving support from a higher number of users in the search of webpages.

Particularly, in the above-mentioned configuration, it is preferable that the number-of-member information includes the information on the number of dues-paying members and the number of dues-free members, the access information includes the information on the number of visitors of the page, and that the degree-of-popularity calculating means calculates the degree of popularity of the menu based on the number of dues-paying members, the number of dues-free members, and the number of visitors of the menu to which the page belongs counted from the number of visitors of the page. In this case, the degree of popularity of the menu is calculated based on the number of dues-paying members and the number of dues-free members of the menu to which the searched page belongs, and the number of visitors of the menu, and it is thereby possible to calculate the degree of popularity of the menu with support of users more reflected while reflecting the number of dues-paying members, the number of dues-free members and the number of visitors of the menu.

For example, in the above-mentioned configuration, it is considered that the degree-of-popularity calculating means calculates the degree of popularity of the menu by adding values obtained by multiplying the number of dues-paying members and the number of dues-free members by respective different coefficients and the number of visitors of the menu. In this case, since the number of dues-paying members and the number of dues-free members of the menu are multiplied by respective different coefficients, by reflecting the degree of reliability in the coefficients, it is possible to calculate the degree of popularity of the menu with support of users more reflected.

Particularly, in the above-mentioned configuration, it is preferable that the coefficient for the number of dues-paying members is higher than the coefficient for the number of dues-free members. In this case, the coefficient is made high for the number of dues-paying members with reliability higher than that of the number of dues-free members, and it is thereby possible to calculate the degree of popularity of the menu with support of users more reflected.

In addition, in the above-mentioned configuration, the number-of-member information may include the information on the membership dues charged to each of the dues-paying members, so that the degree-of-popularity calculating means calculates the degree of popularity of the menu based on the membership dues. It is generally considered that the amount of the membership dues charged to each of the dues-paying members reflects support of users. For example, it is conceivable that the menu providing service regarded as having the reasonable membership dues collects many members. Therefore, by calculating the number of popularity of the menu based on such membership dues, it is possible to calculate the degree of popularity of the menu with support of users more reflected.

Further, in the above-mentioned configuration, it is preferable that the access information includes the information on the number of accesses and the number of visitors each of the page, and that the degree-of-popularity calculating means calculates the degree of popularity of the page based on the number of accesses and the number of visitors each of the page. In this case, since the degree of popularity of the page is calculated based on the number of accesses and the number of visitors each of the page, it is possible to calculate the degree of popularity of the page with support of users more reflected while reflecting the number of accesses and the number of visitors each of the page.

For example, in the above-mentioned configuration, it is considered that the degree-of-popularity calculating means calculates the degree of popularity of the page by adding the number of accesses of the page multiplied by a coefficient and the number of visitors of the page multiplied by another different coefficient. In this case, since the number of accesses and the number of visitors of the page are multiplied by respective different coefficients, by reflecting the degree of reliability in the coefficients, it is possible to calculate the degree of popularity of the page with support of users more reflected.

Particularly, in the above-mentioned configuration, it is preferable that the coefficient for the number of visitors of the page is higher than the coefficient for the number of accesses of the page. In this case, the coefficient is made high for the number of visitors with reliability higher than that of the number of accesses, and it is thereby possible to calculate the degree of popularity of the page with support of users more reflected.

For example, in the above-mentioned configuration, the information ranking means ranks a plurality of pieces of searched information in descending order of the degree of popularity. By thus ranking a plurality of pieces of information, the user is capable of referring to the information starting with useful information with reliability.

Further, in the above-mentioned configuration, the information displayed in the terminal may be adjusted based on availability of access from the terminal to the information ranked by the information ranking means. In this case, for example, when the terminal cannot gain access to the ranked information, the information is adjusted to other information accessible in the terminal, and it is thereby possible to prevent a situation where the terminal cannot gain access to the useful information with reliability due to characteristics of the ranked information.

For example, in the above-mentioned information, when the information ranked by the information ranking means belongs to a membership-only page requiring advance registration to which the terminal cannot gain access, it is considered displaying information related to the non-membership page related to the membership-only page to which the terminal can gain access. In this case, it is possible to display the information related to the non-membership page related to the membership-only page to which the terminal can gain access, and therefore, for example, by gaining access to the membership-only page through the non-membership page, it is possible to display the searched information.

Particularly, in the above-mentioned configuration, when the membership-only page belongs to a website having a hierarchical structure, it is considered displaying information related to the non-membership page in a higher layer closest to the membership-only page. In this case, since it is possible to display the information related to the non-membership page in a higher layer closest to the membership-only page, although it is necessary to make a membership registration separately, the membership-only page including the searched information can be displayed in the shortest procedure.

Further, in the above-mentioned configuration, when the membership-only page belongs to a website having a hierarchical structure, such information may be displayed that is related to the front page of the website. In general, procedures required to make a membership registration are often displayed on the front page. Therefore, by thus displaying the front page, it is possible to perform the procedures for the membership registration in the shortest procedure.

The search method of the invention is characterized by a search method for searching a database based on a keyword input from a terminal while outputting a result of the search to the terminal to display, having a search step of searching the database for information including the input keyword, a degree-of-popularity calculating step of acquiring number-of-member information from a server having the number-of-member information on the number of members for each menu and calculating the degree of popularity of the menu based on the acquired number-of-member information, and an information ranking step of ranking a plurality of pieces of information searched in the search step based on the degree of popularity of the menu to which the information belongs calculated in the degree-of-popularity calculating step.

According to the aforementioned method, the number-of-member information for each menu is acquired using the server such as an i-Mode® server or the like having the number-of-member information on the number of members for each menu. Then, the degree of popularity of the menu is calculated using the number-of-member information to reflect in determination of the display order of the search result, and it is thereby possible to preferentially display the useful information with reliability receiving support from many users in the search of webpages.

Further, in the above-mentioned method, it is preferable that the degree-of-popularity calculating step acquires the access information from the server having the access information on access for each page, and calculates the degree of popularity of the page based on the access information, and that the information ranking step ranks a plurality of pieces of information searched in the search step based on the degree of popularity of the menu and the degree of popularity of the page to which the information belongs calculated in the degree-of-popularity calculating step. In this case, the access information for each page is acquired from the server such as an i-Mode® server or the like having the access information on access for each page. Then, the degree of popularity of the page is calculated using the access information to reflect in determination of the display order of the search result, and it is thereby possible to preferentially display the useful information with reliability receiving support from a higher number of users in the search of webpages.

BRIEF DESCRIPTION OF THE DRAWINGS

The various features of novelty which characterize the invention are pointed out with particularity in the claims attached to and forming a part of this specification. For a better understanding of the invention, its operating advantages, and specific objects attained by its use, reference should be had to the accompanying drawing and descriptive matter in which there is illustrated and described a preferred embodiment of the invention.

DESCRIPTION OF THE PREFERRED EMBODIMENTS

Embodiments of the invention will be described below with reference to accompanying drawings.

Figure 1:
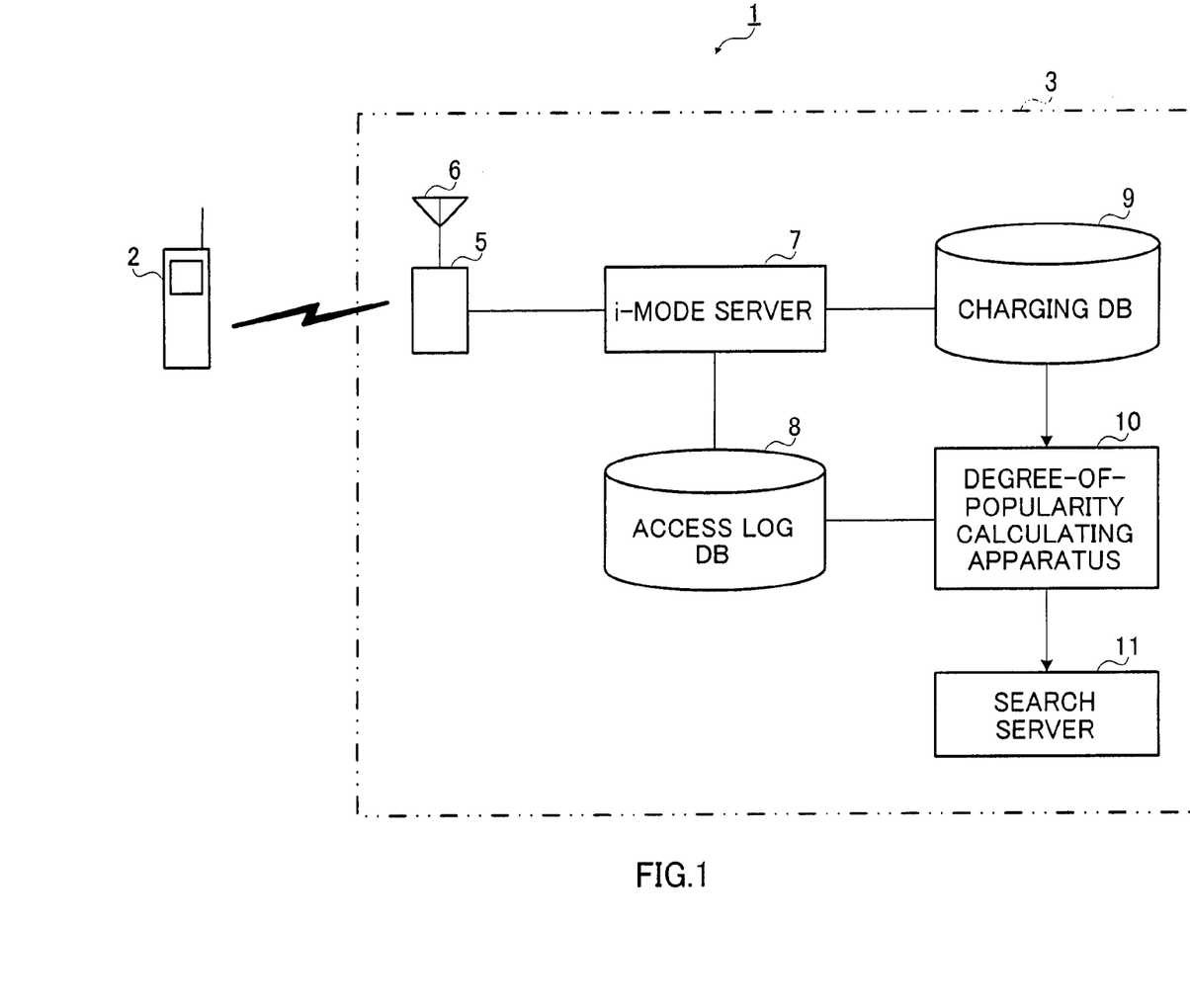
FIG. 1 is a diagram illustrating a schematic configuration of a search system according to a first embodiment of the invention.

FIG. 1 is a diagram showing a search system 1 according to the first embodiment of the invention. As shown in the figure, the search system 1 of this embodiment comprises a portable terminal 2, and a communication facility 3 of a communication common carrier having the communication facility (mainly, channel network). The portable terminal 2 has an operating system (mobile device OS), and the browser function, viewer function, JAM (Java® Application Manager) and other functions operate on the mobile device OS.

Figure 2:
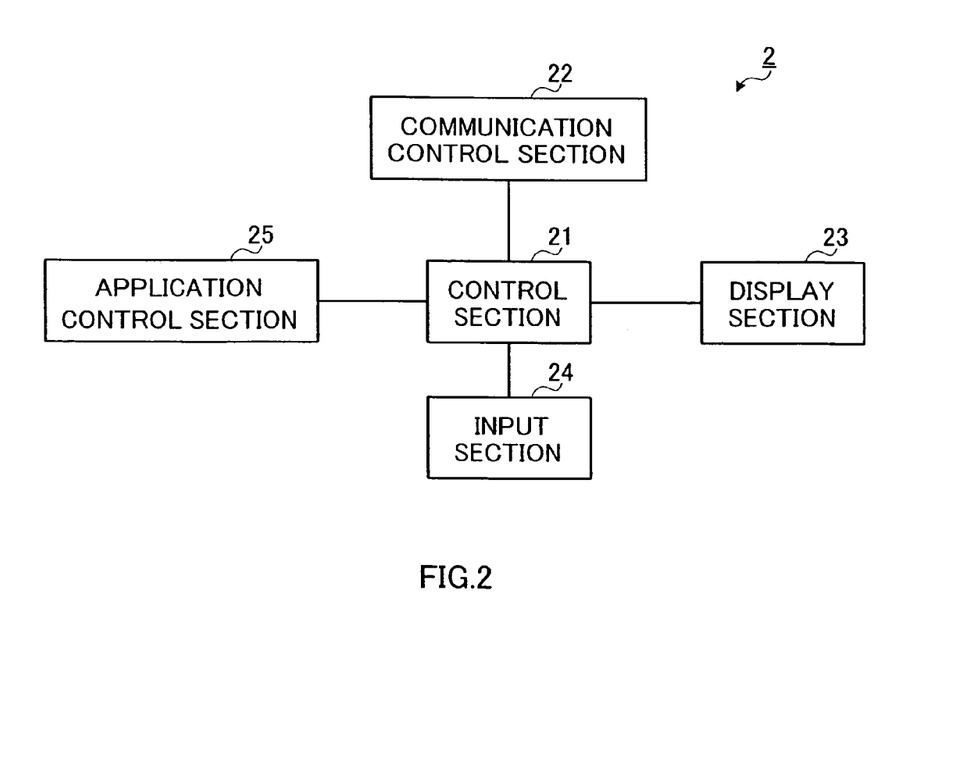
FIG. 2 is a block diagram illustrating a schematic configuration of a portable terminal in the search system as shown in FIG. 1.

FIG. 2 is a block diagram illustrating a schematic configuration of the portable terminal 2. In addition, the configuration as shown in FIG. 2 is simplified to explain the invention and assumed to have components installed in normal portable terminals. As shown in FIG. 2, the portable terminal 2 is principally comprised of a control section 21 that controls the entire apparatus, a communication control section 22 that performs communications with the communication facility 3, a display section 23 that displays various kinds of data and position information, an input section 24 to input a variety of data (such as a keyword and the like described later) associated with an information search and the like, and an application control section 25 to start various kinds of applications installed in or downloaded to the portable terminal 2. In this case, the communication control section 22 can also control communications of information associated with a keyword search. The application control section 25 executes an application program created in an application language (for example, Java® language) corresponding to an instruction of the control section 21.

The communication facility 3 includes a mobile packet communication network in addition to the normal mobile communication network. Further, the communication facility 3 serves the gateway function for connecting the mobile communication network and the Internet, and more specifically, has the information distribution function, mail transmission and reception function, mail storage function, contract client management function, information provider management function, and information charging function.

Figure 4:
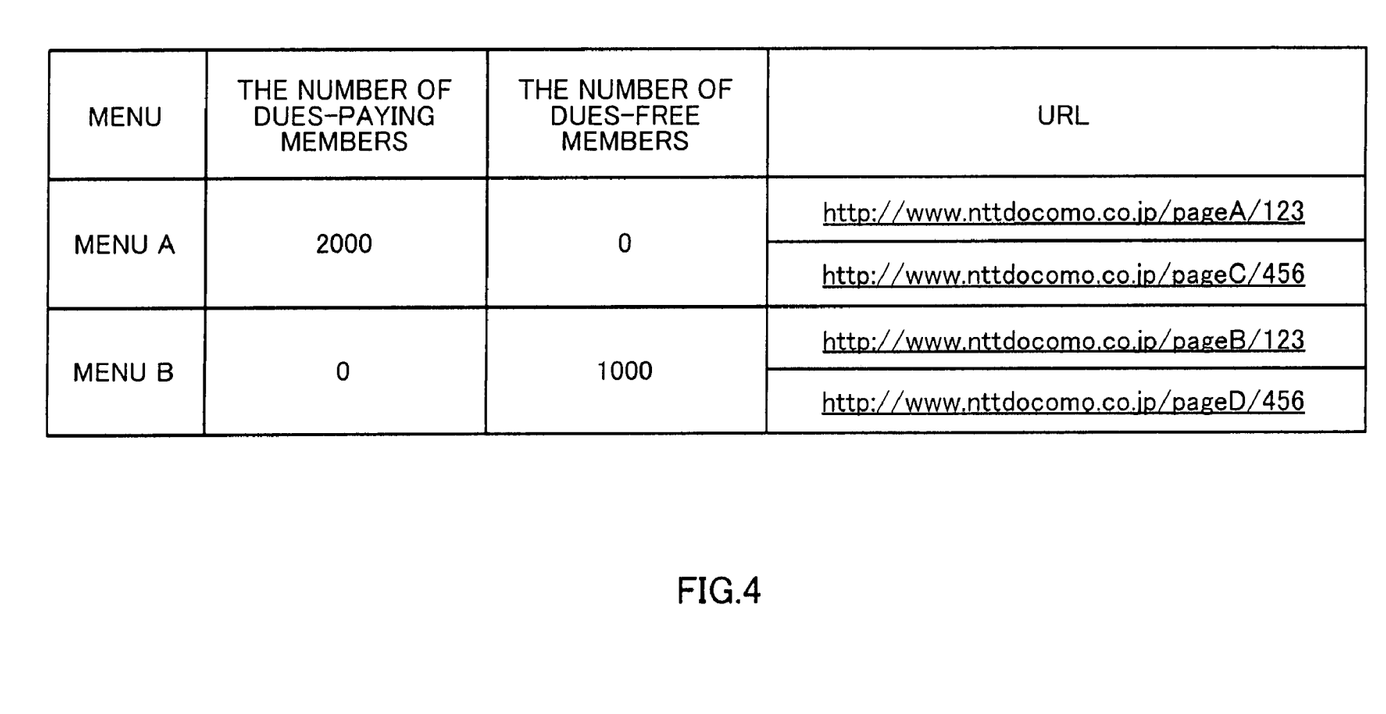
FIG. 4 is a diagram showing an example of information registered with a charging log in a charging database in the search system as shown in FIG. 1.

As shown in FIG. 1, the communication facility 3 has a transmission reception apparatus 5 that performs communications with the portable terminal 2, an antenna 6 used by the transmission reception apparatus 5, an i-Mode® server 7 comprised of a switching equipment group that converts the content for webpages of an existing Web server (not shown in the figure) into compact HTML (HyperText Markup Language) for i-Mode® to respond, an access log database 8 that stores an access log(access history) obtained from the i-Mode® server 7, a charging database 9 that stores a charging log (charging history) obtained from the i-Mode® server 7, a degree-of-popularity calculating apparatus 10 that calculates the degree of popularity of a menu in which webpages (hereinafter, referred to as a page(s) as appropriate) and various pages are sorted for each category thereof, according to the access log stored in the access log database 8 and the charging log stored in the charging database, and a search server 11 that searches a database based on a keyword input from the portable terminal 2, while ranking a result of the search corresponding to the degree of popularity of the menu and/or page and outputting the resultant to the portable terminal 2 to be displayed. In addition, the access log stored in the access log database 8 corresponds to the access information, and the charging log stored in the charging database 9 includes the number-of-member information as shown in FIG. 4.

Figure 3:
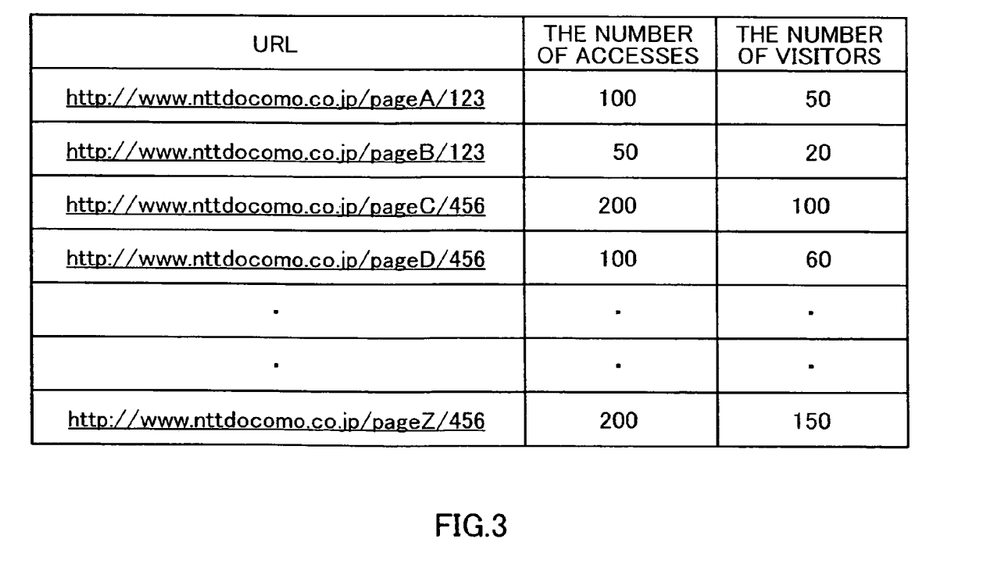
FIG. 3 is a diagram showing an example of information registered with an access log in an access log database in the search system as shown in FIG. 1.

Described herein is an example of information registered with the access log and charging log each obtained from the i-Mode® server 7. FIG. 3 is a diagram showing an example of information registered with the access log, and FIG. 4 is a diagram showing an example of information registered with the charging log. As shown in FIG. 3, the access log obtained from the i-Mode® server 7 includes the number of accesses (the number of total clicks) and the number of visitors (the number of users that visited) for each URL associated with each page. FIG. 3 shows the case where the information is registered that is related to URLs respectively corresponding to the page A, page B, page C, page D, . . . , page Z. For example, for the page A, URL[http://www.nttdocomo.co.jp/page A/123] is associated, and "100" and "50" are registered respectively as the number of accesses and the number of visitors. Further, as shown in FIG. 4, the charging log obtained from the i-Mode® server 7 includes for each menu the number of dues-free members, the number of dues-paying members and URLs of pages belonging to the menu. FIG. 4 shows the case where the information included in the menu A and menu B is registered. For example, for the menu A, "2000" and "0" are registered respectively as the number of dues-paying members and the number dues-free members, and URL[http://www.nttdocomo.co.jp/page A/123] of the page A and URL[http://www.nttdocomo.co.jp/page C/456] of the page C are registered as the URL of a page belonging to the menu.

The number-of-popularity calculating apparatus 10 has a function as an access log analyzing server for analyzing the access log and charging log to output access numerical data, another function of generating for each menu a log compilation file including the number of accesses, the number of visitors and the number of members from the access numerical data, and still another function of calculating the degrees of popularity of the menu and page from the generated log compilation file. In addition, the method of calculating the degrees of popularity of the page and menu in the degree-of-popularity calculating apparatus 10 will be described later.

In general search sites, it is possible to grasp the number of accesses from search results, but it is not possible to compile accesses from a link and bookmark in the site; and another search site. Further, such a case often arises that the page or site with higher reliability has the high number of visitors and the high number of accesses, and the site has many dues-paying/dues-free members. In other words, the site that many users visit and that frequently receive the access has useful information, and conversely, the site hardly having useful information has the low number of visitors.

The invention enables compilation of accesses from the link and bookmark in the site and another search site (in other words, enables the number of total clicks to be known), by using the i-Mode® server 7. Further, by using the i-Mode® server 7, it is possible to know "the number of members" and "the number of visitors" for each menu. It is thereby possible to reflect "the degree of support by users on the information" in determination of a display order of the search result.

Figure 5A:
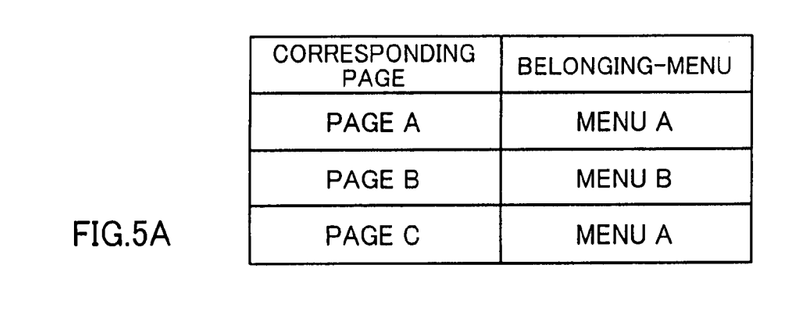
FIG. 5 is a diagram showing an example of information acquired from the access log database and charging database of the search system as shown in FIG. 1.
Figure 5B:
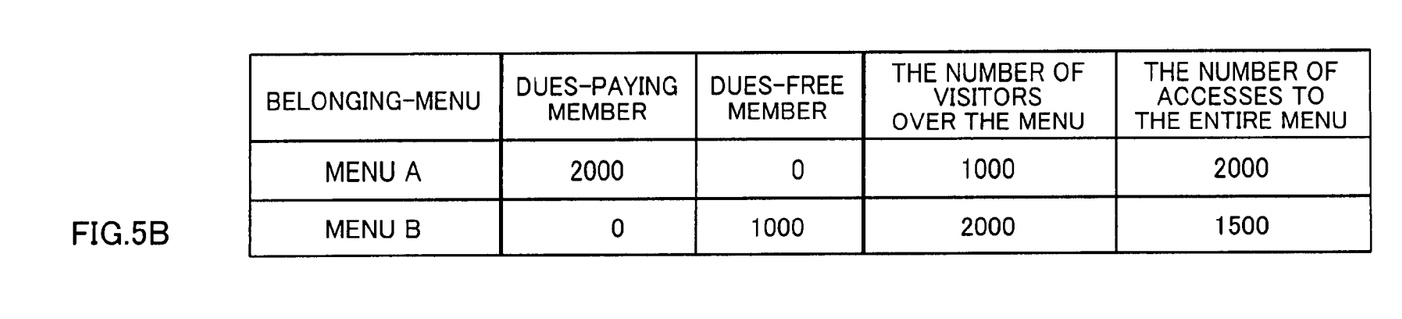
Figure 5C:
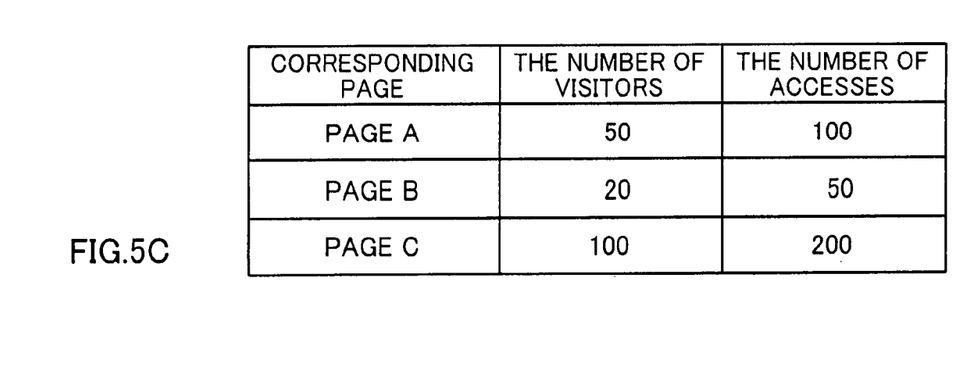

FIG. 5 is a diagram showing an example of information acquired from the access log database 8 and charging database 9. Herein, it is assumed that the access log as shown in FIG. 3 and charging log as shown in FIG. 4 are respectively registered with the access log database 8 and charging database 9. FIG. 5A shows the corresponding page (page having the information including a keyword), and a menu (belonging-menu) to which the page belongs. In this case, the page A is included in the menu A, the page B is included in the menu B, and the page C is included in the menu A. FIG. 5B shows "the number of dues-paying members", "the number of dues-free members", "the number of visitors over the entire menu", and "the number of accesses to the entire menu" each for the belonging-menu. "The number of visitors over the entire menu", and "the number of accesses to the entire menu" are calculated by compiling the number of visitors and the number of accesses in each page belonging to the menu in the charging log. In this case, in the menu A, the number of dues-paying member is "2000", the number of dues-free members is "0", the number of visitors over the entire menu is "1000", and the number of accesses to the entire menu is "2000". Further, in the menu B, the number of dues-paying member is "0", the number of dues-free members is "1000", the number of visitors over the entire menu is "2000", and the number of accesses to the entire menu is "1500". FIG. 5C shows the number of visitors and the number of accesses for the corresponding page. In this case, in the page A, the number of visitors is "50", and the number of accesses is "100". Further, in the page B, the number of visitors is "20" and the number of accesses is "50". Furthermore, in the page C, the number of visitors is "100", and the number of accesses is "200".

Described herein is the method of calculating the degrees of popularity of the page and menu in the degree-of-popularity calculating apparatus 10. For example, the degree-of-popularity calculating apparatus 10 calculates the degree of popularity of the menu (the degree of menu popularity) by adding the number of dues-paying members and the number of dues-free members of the menu to which the page belongs in the charging log, and the number of visitors and the number of accesses in the entire menu. In this case, from the viewpoint of improving the reliability, the degree-of-popularity calculating apparatus 10 multiplies the number of dues-paying members and the number of dues-free members by different coefficients, and further multiplies the number of visitors and the number of accesses by different coefficients. More specifically, the apparatus 10 multiplies the number of dues-paying members by a coefficient higher than that for the number of dues-free members, and the number of visitors by a coefficient higher than that for the number of accesses. This is because the number of dues-paying members who pay the membership dues is considered reflecting the reliability higher than that of the number of dues-free members who do not pay the membership dues. Similarly, the number of visitors, such that the access from the same visitor during a predetermined period is regarded as a single access, is considered reflecting the reliability higher than that of the number of accesses. Thus, by setting the coefficients in calculating the degree of menu popularity, it is possible to calculate the degree of popularity of the menu with support of users more reflected.

Meanwhile, for example, the degree-of-popularity calculating apparatus 10 calculates the degree of popularity of the page (the degree of page popularity) by adding the number of accesses and the number of visitors each of the corresponding page in the access log. Also in this case, from the same viewpoint as that of the degree of menu popularity, the degree-of-popularity calculating apparatus 10 multiplies the number of visitors by a coefficient higher than that for the number of accesses. Thus, by setting the coefficients in calculating the degree of page popularity, it is possible to calculate the degree of popularity of the page with support of users more reflected.

For example, the degree-of-popularity calculating apparatus 10 calculates the degree of menu popularity and the degree of page popularity using equations (1) and (2) as described below. For example, setting coefficients for the number of dues-paying members and the number of visitors at "1.0" and coefficients for the number of dues-free members and the number of accesses at "0.5", following equations hold.

$$\text{The degree of menu popularity} = (\text{the number of dues-paying members} \times 1.0) + (\text{the number of dues-free members} \times 0.5) + (\text{the number of visitors of the menu} \times 1.0) + (\text{the number of accesses of the menu} \times 0.5) \quad (1)$$

$$\text{The degree of page popularity} = (\text{the number of visitors of the page} \times 1.0) + (\text{the number of accesses of the page} \times 0.5) \quad (2)$$

Thus calculated degree of menu popularity and degree of page popularity are input to the search server 11.

Figure 6:
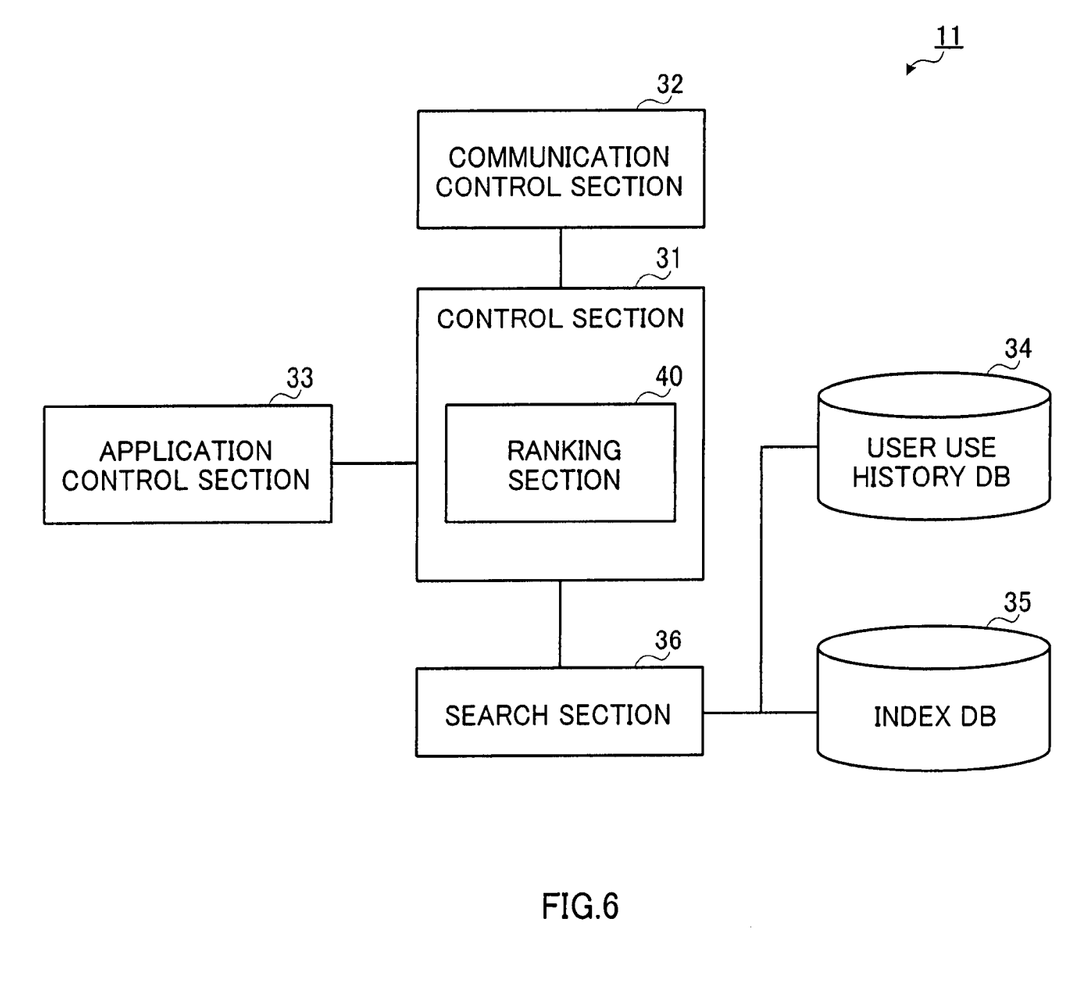
FIG. 6 is a block diagram illustrating a schematic configuration of a search server the search system as shown in FIG. 1.

FIG. 6 is a block diagram illustrating a schematic configuration of the search server 11. The search server 11 has the keyword search function of searching the database based on a keyword input from the portable terminal 2, while outputting the search result to the portable terminal 2 to be displayed, and has components as shown in FIG. 4 as a configuration for such a function, but may have other components to execute other functions as well as the information search.

As shown in FIG. 6, the search server 11 includes a control section 31 that controls the entire apparatus, a communication control section 32 that performs communications with the portable terminal 2 via the mobile communication network, an application control section 33 to start various applications, a user use history database 34, an index database 35, and a search section 36 as search means for searching the index database 35 for information including a keyword input from the portable terminal 2.

The communication control section 32 is also capable of controlling communications of the information associated with a keyword search. The application control section 33 executes an application program created in an application language (for example, Java® language) corresponding to an instruction of the control section 31. Further, the application control section 33 starts an application for the portable terminal 2 as necessary.

The index database 35 stores various kinds of information such as documents to be searched based on a keyword and the like. Further, the user use history database 34 stores keywords previously input by a user, and contents previously used by the user such as, for example, searched pages (matching information and/or documents including the keyword) which the user previously selected and used, searched pages which the user neither selected nor used, and the like.

The control section 31 has an information ranking section (information ranking means) 40 for ranking all pieces of information searched based on the degree of menu popularity and the degree of page popularity calculated in the degree-of-popularity calculating apparatus 10 (see FIG. 1). In this embodiment, the information ranking section 40 includes a display order determining program (display order determining means) for determining a display order of the searched information in the portable terminal 2, based on the degree of menu popularity and the degree of page popularity calculated in the degree-of-popularity calculating apparatus 10☐ In this case, the information is naturally displayed in descending order of the degree of menu popularity and the degree of page popularity.

Herein, determination of a display order in the search server 11 is described using a specific example. The descriptions of the pages A to C are assumed as described below. Further, a keyword input from the portable terminal 2 is assumed to be a "cellular telephone". It is furthermore assumed that the numbers of visitors and the numbers of accesses in the pages A to C, the numbers of dues-paying members and the numbers of dues-free members of menus to which the pages A to C belong, and the numbers of visitors and the numbers of accesses of the menus are as shown in FIGS. 3 to 5.

Descriptions of the page A: "For cellular telephones, discounter○○ Electrics!! Excellent shop with wide selection."

Descriptions of the page B: "Latest cellular telephone 506 is released!! Loaded with information related to latest cellular telephones including standby screen supporting pagers, ringing tone, etc."

Descriptions of the page C: "We introduce information of FOMA®, Mova®, etc., various services such as i-Mode®, etc, price plans and support information."

Further, the page A is assumed to be a popular site with a high update frequency and a lot of accurate information. Meanwhile, the page B is assumed to have a low update frequency and information with low reliability and thus be an unpopular site that is not supported by users. It is further assumed that the page A is a special site or the like to which users gain access frequently, and that the page B is a page continuing to present wrong information from old times.

Figure 7A:
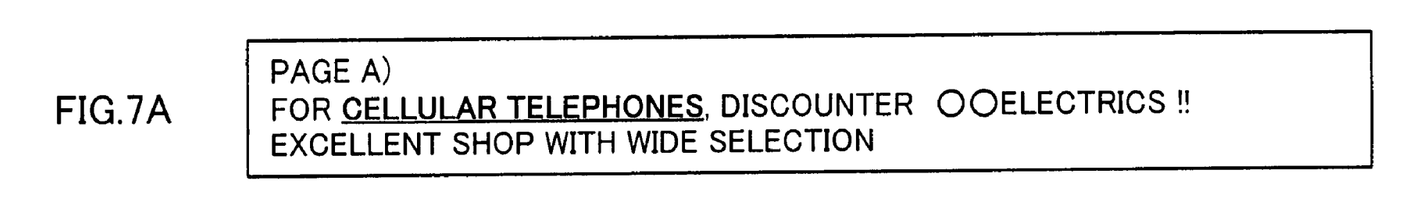
FIG. 7 is a diagram showing an example of webpages
Figure 7B:
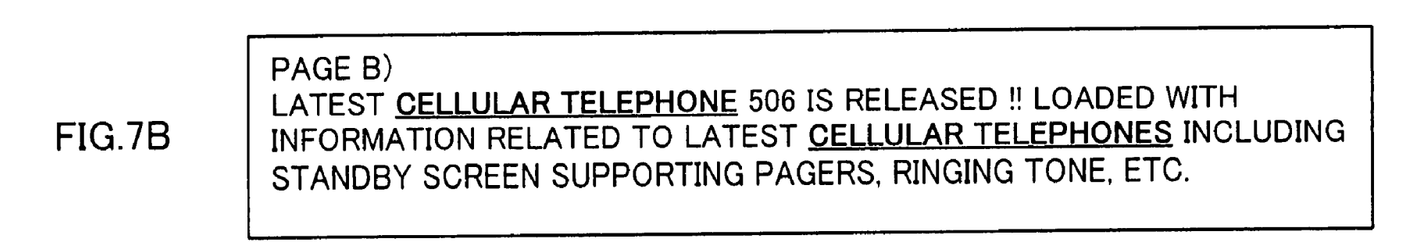
Figure 7C:
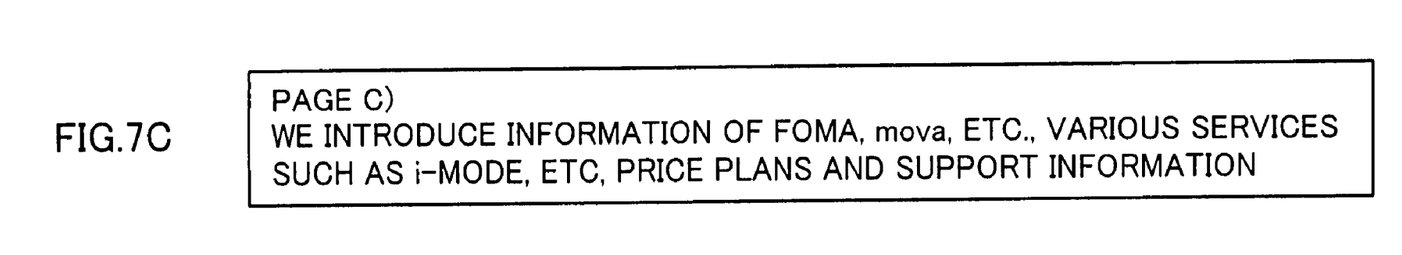

In addition, the descriptions of the pages A to C are also shown in FIG. 7. In FIGS. 7A and 7B, keywords (cellular telephone) of hits are shown by bold and further underlined.

Herein, when a score to determine a display order of a search result is the number of times characters (keyword) match+(degree of menu popularity/1000)+(degree of page popularity/10), scores assigned to the pages A to C are as described below. In addition, when the keyword does not match, the score is not assigned.

Page A: 1+4+10=15 points

The degree of menu popularity of the menu A to which the page A belongs is calculated from above-mentioned equation (1), as (2000×1.0)+(0×0.5)+(1000×1.0)+(2000×0.5)=4000. Further, the degree of page popularity of the page A is calculated from above-mentioned equation (2), as (50×1.0)+(100×0.5)=100.

The page B: 2+3.25+4.25=9.75 points

The degree of menu popularity of the menu B to which the page B belongs is calculated from above-mentioned equation (1), as (0×1.0)+(1000×0.5)+(2000×1.0)+(1500×0.5)=3250. Further, the degree of page popularity of the page B is calculated from above-mentioned equation (2), as (20×1.0))+(50×0.5)=45

The page C: no hit, 0 point

From the result, the page A and page B are displayed in this order in the portable terminal 2. In other words, the page A supported by many users is preferentially displayed. In this case, it is possible to reflect "the degree of support for information" that is not identified from the number of keywords in the page in the search result. In addition, when personal (user) preference is taken in the search result, calculation of the degree of page popularity can be limited to the number of accesses of the user.

Meanwhile, in the case of not considering the degree of menu popularity and the degree of page popularity, scores assigned to the pages A to C are as follows:

Page A: 1=1 point

Page B: 2=2 points

Page C: no hit, 0 point

From the result, the page B and page A are shown in this order in the portable terminal 2. In other words, the page B not supported by users is preferentially displayed. Thus, when the degree of menu popularity and the degree of page popularity are not considered, it is not possible to reflect "the degree of support for information".

Figure 8:
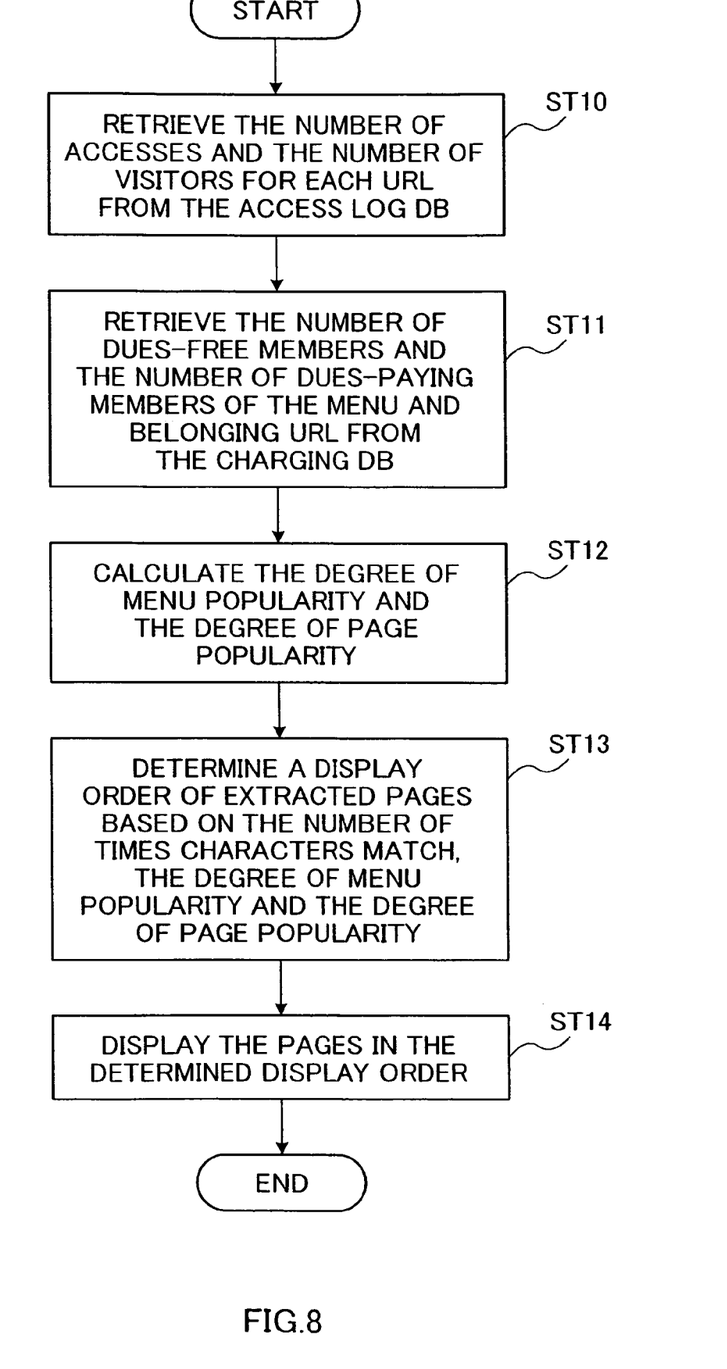
FIG. 8 is a flow diagram to explain a display order determining method of the search server in the search system as shown in FIG. 1

Next, the display order determining operation in the search system 1 with the above-mentioned configuration is described with reference to a flowchart of FIG. 8. In addition, it is assumed that a plurality of pages corresponding to a keyword input from the portable terminal 2 is searched in the search server 11 before proceeding to the flowchart of FIG. 8.

The degree-of-popularity calculating apparatus 10 first retrieves from the access log database 8 the number of accesses and the number of visitors for each URL corresponding to the page having information including the keyword (step S10). Further, the apparatus 10 retrieves from the charging database 9 the number of dues-paying members and the number of dues-free members of the menu to which the page belongs and URL of the page belonging to the menu (step S11).

Next, using retrieved the number of accesses and the number of visitors for each URL corresponding to the page, the number of dues-paying members and the number of dues-free members of the menu to which the page belongs and URL of the page belonging to the menu, the apparatus 10 calculates the degree of menu popularity and the degree of page popularity according to above-mentioned equations (1) and (2) (step S12). The, the apparatus 10 inputs the calculated degree of menu popularity and degree of page popularity to the search server 11.

The search server 11 determines the display order of searched information in the portable terminal 2 based on the degree of menu popularity and the degree of page popularity calculated by the degree-of-popularity calculating apparatus 10 (step S13). Next, the server 11 displays the searched information in the portable terminal 2 in descending order of the degree of menu popularity and the degree of page popularity (step S14).

Thus, in the search system 1 according to this embodiment, the number-of-member information (charging log) on the number of members for each menu is acquired from the i-Mode® server 7, the degree of popularity of the menu is calculated using the number-of-member information to reflect in determination of the display order of the search result, and it is thereby possible to preferentially display the useful information with reliability receiving support from many users in the search of webpages. Further, the access information (access log) on access for each page is acquired from the i-Mode® server 7, the degree of popularity of the page is calculated using the access information to reflect in determination of the display order of the search result, and it is thereby possible to preferentially display the useful information with reliability receiving support from a higher number of users in the search of webpages. Then, by ranking a plurality of pieces of searched information in descending order of the degrees of popularity of the page and menu, the user is capable of referring to the information starting with useful information with reliability.

A case is considered that the portable terminal 2 cannot gain access to the page of which the display order is determined in above-mentioned procedures. For example, such a case includes the case where the page of which the display order is determined is a page only for members (hereinafter, referred to as a "membership-only page" as appropriate) requiring advance registration (including chargeable registration and free-of-charge registration) and the like. In this case, disabling access for the reason that the searched page is a membership-only page is contrary to the subject matter of the invention for preferentially displaying useful information with reliability. Therefore, it is preferable as an embodiment to display a page for non-members (hereinafter, referred to as a "non-membership page" as appropriate) related to the membership-only page as a substitute.

Figure 9:
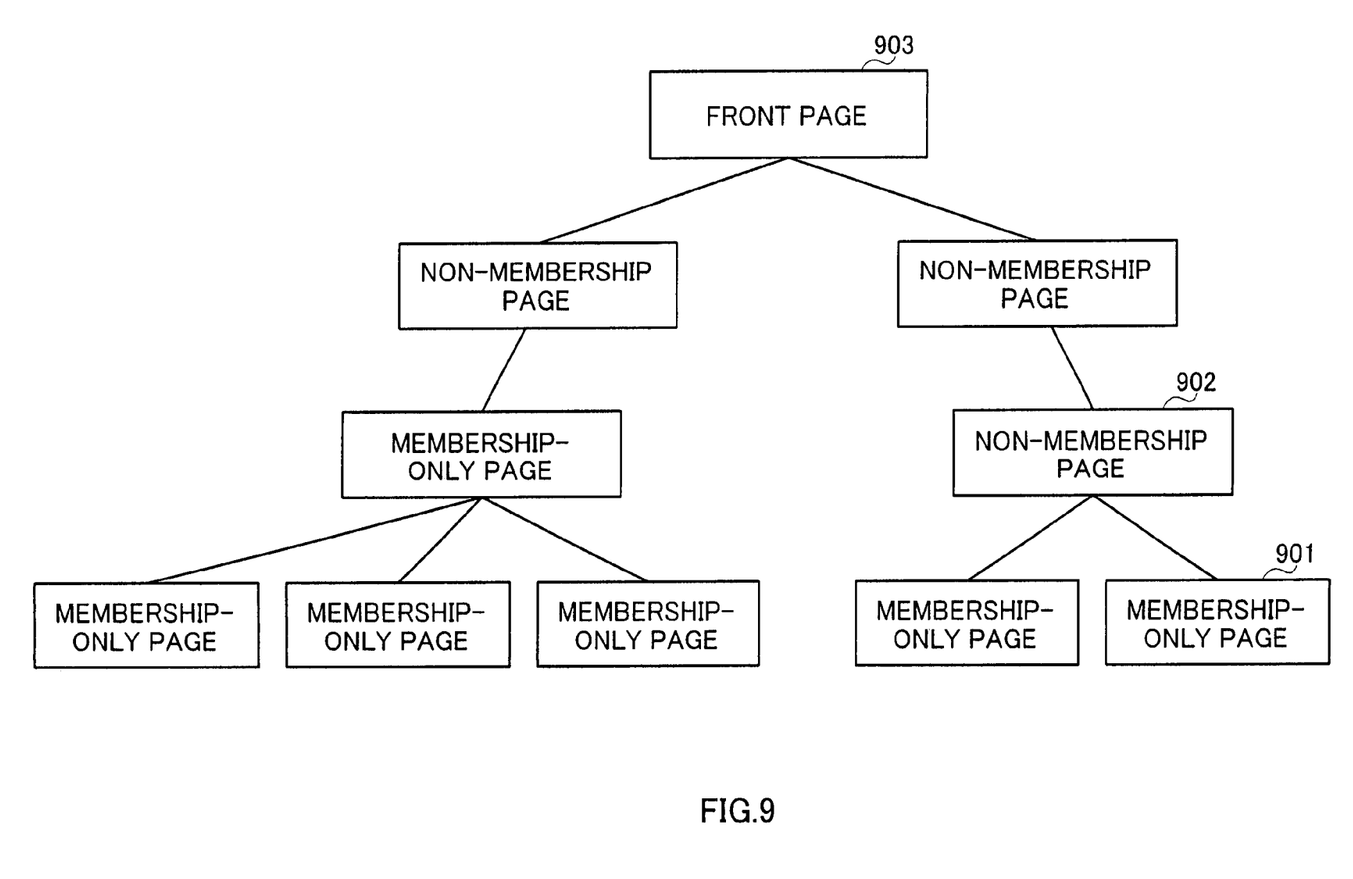
FIG. 9 is a diagram showing an example of a website having a hierarchical structure; an FIG. 10 is a diagram showing an example of information registered with a charging log in a charging database in a search system according to a second embodiment of the invention.

For example, when the searched page is assumed to be a membership-only page 901 in a website having a hierarchical structure as shown in FIG. 9, it is considered displaying a non-membership page 902 located in a higher layer closest to the membership-only page 901. In this case, it is possible to display the searched membership-only page 901 in the shortest procedure, although it is necessary to make a chargeable membership registration separately. Further, a front page 903 of the site to which the searched membership-only page 901 belongs may be displayed. In general, procedures required to make a membership registration are often displayed on the front page. Therefore, when the front page 903 is thus displayed, it is possible to perform the procedures for the membership registration in the shortest procedure.

In addition, to thus display the non-membership page 902 or front page 903 as a substitute for the searched membership-only page 901, it is necessary to manage such a hierarchical structure of the website in the communication facility 3. Such a hierarchical structure of the website can be managed using a table with the URL associated with each page and the information on the membership-only page and non-membership page of each page, or the like. Further, in displaying the non-membership page 902 or front page 903 as a substitute for the searched membership-only page 901, it is preferable to inform the user of such display prior to display of the non-membership page 902 or the like.

Second Embodiment

In the search system 1 according to the first embodiment, from the viewpoint of improving the reliability, the degree-of-popularity calculating apparatus 10 multiplies the number of dues-paying members by a coefficient higher than that for the number of dues-free members. The search system 1 according to the second embodiment differs from the search system 1 according to the first embodiment in a respect that from the same viewpoint, the amount of membership dues is considered in calculating the degree of menu popularity. In other words, in menus with high membership dues required for dues-paying membership registration, service contents required from users are sophisticated as compared with menus with low membership dues and free-of-charge menus. Therefore, the number of dues-paying members loaded with such membership dues is considered reflecting the reliability higher than that of the number of dues-paying members of a menu with low membership dues and the number of dues-free members.

Figure 10:
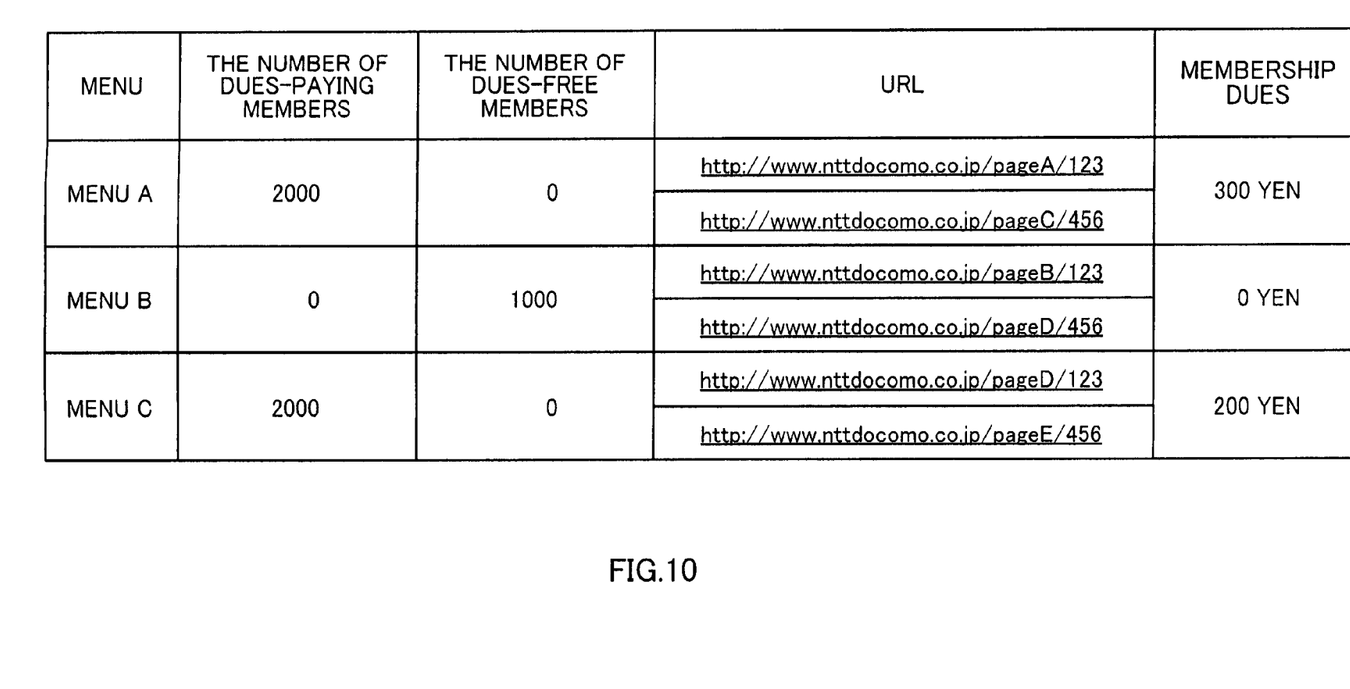

When the amount of membership dues is thus taken into account in calculating the degree of menu popularity, for example, it is considered including the information on the membership dues in the charging log. FIG. 10 is a diagram showing an example of the information registered with the charging log. In the charging log as shown in FIG. 10, the information on the membership dues is added, as compared with the charging log as shown in FIG. 4. Shown herein are the case where the membership dues in the menu A is "300 yen", and the menu C having the same number of members (dues-paying members and dues-free members) as that of the menu A is added.

Based on the information thus registered with the charging log, the degree-of-popularity calculating apparatus 10 calculates the degree of menu popularity. For example, when the degrees of menu popularity in the menu A and menu C are calculated applying equation (1) as described previously, the degree-of-popularity calculating apparatus 10 calculates the higher number of points in the menu A than that in the menu C. In addition, in this case, the number of visitors and the number of accesses are assumed to be the same in the menus A and C. Further, the method of using membership dues in calculating the degree of menu popularity is not limited particularly. For example, as shown in FIG. 10, when the membership dues are two hundred yen or three hundred yen, it is considered that a value obtained by dividing the membership dues by "100" is added to a value obtained in equation (1) as described previously. In the case where the degree of menu popularity is thus calculated, in the same way as in the search system according to the first embodiment, by ranking a plurality of pieces of searched information in descending order of the degrees of popularity of the page and menu, the user is capable of referring to the information starting with the useful information with reliability.

In addition, described herein is the case of applying the membership dues to equation (1) as described previously in calculating the degree of menu popularity. However, the method of calculating the degree of menu popularity using membership dues is not limited thereto, and is capable of being modified as appropriate.

Moreover, the invention is not limited to the above-mentioned embodiments, and is capable of being carried into practice with various modifications thereof. For example, the method of calculating the degree of menu popularity and the degree of page popularity in the above-mentioned embodiments is of one example, and is capable of being carried into practice with modifications thereof as appropriate without being limited thereto. Further, processing sections and processing procedures are capable of being carried into practice with modifications thereof as appropriate without departing from the scope of the invention. Other elements are also capable of being carried into practice with modifications thereof as appropriate without departing from the scope of the invention.

What is claimed is:

1. A computer implemented system operable to search information stored in a database upon receipt of a keyword input, comprising:
    a terminal having at least one terminal controller for controlling the terminal, the terminal controller being in operable communication with input means for inputting and display means for displaying, the keyword input;
    at least one server comprising a communication controller for controlling the operation of the at least one server, and the communications controller being in operable communication with the terminal controller and calculating means;
    the calculating means comprising a degree-of-popularity calculating section which acquires number-of-member information from the at least one server having the number-of-member information on the number of members for each menu in which various webpages are sorted for each category thereof and the number-of-member information including a number of members who pay dues and a number of members who do not pay dues, and calculates a degree of popularity of the menu based on the acquired number-of-member information; and
    the at least one server being configured to search the database for the keyword input and to generate a search result comprising a plurality of pieces of information and the at least one server comprising an information ranking section that ranks the search result based on the degree of popularity of the menu.

2. The computer implemented system according to claim 1, wherein the at least one server comprises webpage access information for a webpage and the degree-of-popularity calculating section acquires the webpage access information from the at least one server, and calculates the degree of popularity of the webpage based on the webpage access information, and
    the information ranking section ranks the search result based on the degree of popularity of the menu and the degree of popularity of the webpage corresponding to the webpage access information.

3. The computer implemented system according to claim 2, wherein,
    the webpage access information includes information on the number of visitors of the webpage, and
    the degree-of-popularity calculating section calculates the degree of popularity of the menu based on the number of the members who pay dues, the number of the members who do not pay dues, and the number of visitors of the menu to which the webpage belongs counted from the number of visitors of the webpage.

4. The computer implemented system according to claim 3, wherein the degree-of-popularity calculating section calculates the degree of popularity of the menu by adding values obtained by multiplying the number of the members who pay dues and the number of the members who do not pay dues by respective different coefficients and the number of visitors of the menu.

5. The computer implemented system according to claim 4, wherein the coefficient for the number of the members who pay dues is higher than the coefficient for the number of the members who do not pay dues.

6. The computer implemented system according to claim 3, wherein the number-of-member information includes the information on the membership dues charged to each of the members who pay dues, and
    the degree-of-popularity calculating section calculates the degree of popularity of the menu based on the membership dues.

7. The computer implemented system according to claim 2, wherein the webpage access information includes information on the number of accesses and the number of visitors each of the webpage, and
    the degree-of-popularity calculating section calculates the degree of popularity of the webpage based on the number of accesses and the number of visitors each of the webpage.

8. The computer implemented system according to claim 7, wherein the degree-of-popularity calculating section calculates the degree of popularity of the webpage by adding the number of accesses of the webpage multiplied by a coefficient and the number of visitors of the webpage multiplied by another different coefficient.

9. The computer implemented system according to claim 8, wherein the coefficient for the number of visitors of the webpage is higher than the coefficient for the number of accesses of the webpage.

10. The computer implemented system according to claim 1, wherein the information ranking section ranks the search result in descending order of the degree of popularity.

11. The computer implemented system according to claim 1, wherein information displayed in the terminal is adjusted based on availability of access from the terminal to the search result ranked by the information ranking section.

12. The computer implemented system according to claim 11, wherein when the information ranked by the information ranking section belongs to a membership-only webpage requiring advance registration to which the terminal access thereto is blocked, information is displayed that is related to a non-membership webpage related to the membership-only webpage to which the terminal access is available.

13. The computer implemented system according to claim 12, wherein when the membership-only webpage belongs to a website having a hierarchical structure, information is displayed that is related to the non-membership webpage in a higher layer closest to the membership-only page.

14. The computer implemented system according to claim 12, wherein when the membership-only webpage belongs to a website having a hierarchical structure, information is displayed that is related to a front page of the website.

15. A computer implemented method for searching information stored in a database upon receipt of a keyword input, comprising:
    providing a terminal having at least one terminal controller for controlling the terminal, at least one server comprising a communications controller for controlling operation of the at least one server and the communications controller being in operable communication with at least one server and calculating means;

transmitting a keyword from the terminal to the at least one server;

the at least one server searching the database for the keyword input;

the at least one server generating a search result comprising a plurality of pieces of information;

the calculating means acquiring number-of-member information from the at least one server having the number-of-member information on the number-of-members for each menu in which various webpages are sorted for each category thereof and the number-of-member information including a number of members who pay dues and a number of members who do not pay dues;

the calculating means calculating a degree of popularity of the menu based on the acquired number-of-member information; and the at least one server ranking the search result based on the degree of popularity of the menu.

16. The method according to claim 15, wherein the calculating the degree-of-popularity includes acquiring webpage access information from the at least one server, and calculates the degree of popularity of the webpage based on the webpage access information, and the ranking of the search result includes ranking based on the degree of popularity of the menu and the degree of popularity of the webpage to which the information belongs calculated in the degree-of-popularity calculating step.

* * * * *